(12) United States Patent
Hayashi et al.

(10) Patent No.: US 12,072,180 B2
(45) Date of Patent: Aug. 27, 2024

(54) MEASUREMENT METHOD FOR AMOUNT OF DEVIATION, AND MEASUREMENT APPARATUS

(71) Applicant: OMRON Corporation, Kyoto (JP)

(72) Inventors: Shingo Hayashi, Kyoto (JP); Beiping Jin, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 79 days.

(21) Appl. No.: 18/157,345

(22) Filed: Jan. 20, 2023

(65) Prior Publication Data

US 2023/0243646 A1 Aug. 3, 2023

(30) Foreign Application Priority Data

Feb. 2, 2022 (JP) .................................. 2022-015251

(51) Int. Cl.
*G01B 11/26* (2006.01)
*G06T 7/70* (2017.01)
(Continued)

(52) U.S. Cl.
CPC ................ *G01B 11/26* (2013.01); *G06T 7/70* (2017.01); *G06T 7/80* (2017.01); *H04N 7/183* (2013.01);
(Continued)

(58) Field of Classification Search
CPC .... G01B 11/26; G01B 11/022; G01B 21/045; G01B 2210/58; G06T 7/70; G06T 7/80;
(Continued)

(56) References Cited

U.S. PATENT DOCUMENTS 10,401,609 B2 9/2019 Ou et al.
2018/0151400 A1* 5/2018 Wang .................. G06T 7/73
(Continued)

FOREIGN PATENT DOCUMENTS

EP 2503326 A1 9/2012
JP 2003318249 A 11/2003
(Continued)

OTHER PUBLICATIONS

Office Action issued in Taiwanese Appln. No. 112101993, issued on Aug. 29, 2023. English translation provided.

*Primary Examiner* — Michael E Teitelbaum
(74) *Attorney, Agent, or Firm* — ROSSI, KIMMS & McDOWELL LLP

(57) ABSTRACT

Provided are a measurement method, and a measurement device that enable measuring a deviation amount in an arrangement angle of a camera, with respect to a reference direction of a shaft of the camera, and that enable correcting a deviation in the arrangement angle at low cost with high accuracy. The measurement method includes: an imaging step of imaging a target object, provided with a reference mark configured to identify a slope-known straight line, a plurality of times in different visual fields; an image processing step of obtaining the straight line identified based on the reference mark where a plurality of the straight lines corresponds to a plurality of the reference marks in images imaged in the different visual fields, respectively; and a calculating step of calculating a rotation angle, as the deviation amount in the arrangement angle, with which a distance between the straight lines becomes zero.

12 Claims, 8 Drawing Sheets

(51) Int. Cl.
   *G06T 7/80*     (2017.01)
   *H04N 7/18*     (2006.01)
   *H04N 17/00*    (2006.01)

(52) U.S. Cl.
   CPC . *H04N 17/002* (2013.01); *G06T 2207/30208* (2013.01); *G06T 2207/30244* (2013.01)

(58) Field of Classification Search
   CPC .......... G06T 2207/30208; G06T 2207/30244; H04N 7/183; H04N 17/002; G08B 21/182
   See application file for complete search history.

(56)           References Cited

U.S. PATENT DOCUMENTS

2019/0171328 A1*  6/2019  Chih .......................... G06T 7/73
2022/0005721 A1*  1/2022  Liu ........................... G06T 7/73
2022/0291593 A1*  9/2022  Werkman ............ G03F 7/70475

FOREIGN PATENT DOCUMENTS

| JP | 2013239720 A  | 11/2013 |
| JP | 2019090755 A  | 6/2019  |
| WO | 2014160142 A1 | 10/2014 |
| WO | 2021096712 A1 | 5/2021  |

\* cited by examiner

MEASUREMENT METHOD FOR AMOUNT OF DEVIATION, AND MEASUREMENT APPARATUS

CROSS-REFERENCE TO RELATED APPLICATION

This application is based on Japanese Patent Application No. 2022-015251 filed with the Japan Patent Office on Feb. 2, 2022, the entire contents of which are incorporated herein by reference.

TECHNICAL FIELD

The present invention relates to a measurement method for amount of deviation, and a measurement device.

BACKGROUND ART

There has been a conventionally known accuracy measurement device for an aligner, which adjusts the position of a semiconductor wafer (see, for example, Japanese Unexamined Patent Publication No. 2003-318249 (Patent Document 1)). The accuracy measurement device includes an imaging unit and an image processing device. The imaging unit images a pair of markings provided at a predetermined interval on the measurement surface of a wafer for accuracy measurement, which is detachably attached to a reference mark on a wafer mounting table. The imaging is performed when the wafer is positioned on the reference mark and when the position of the wafer is adjusted by the aligner. The image processing device measures the accuracy of the aligner based on image information acquired from each imaging.

There has been also a known electronic component mounting device (see, for example, Japanese Unexamined Patent Publication No. 2013-239720 (Patent Document 2)). The electronic component mounting device includes a component mounting head, a camera, and an image processor. The camera acquires an image of an electronic component. The image processor corrects distortion on the acquired image of the electronic component based on distortion correction data. The image processor then recognizes the position of the electronic component based on the distortion-corrected image. Here, a method is used to correct image distortion caused by the camera position and lens distortion generated in the component position recognition camera of the electronic component mounting device. This method uses a distortion correction jig provided with a dot chart to allow the camera to image the distortion correction jig, therefore enabling detection of an angular deviation. There has been also a known calibration method for calibrating a deviation in an optical axis direction of a stereo camera including a first camera and a second camera fixed by a camera support (see, for example, Japanese Unexamined Patent Publication No. 2019-090755 (Patent Document 3)). The calibration method enables creation of correction data by imaging calibration charts and by comparing the coordinates of output grid points with previously-retained ideal coordinates without deviation.

SUMMARY OF THE INVENTION

For example, there may be a case in which a camera is caused to translate along a shaft to image a subject to be imaged, or a case in which the camera is fixed to the shaft to image a subject to be imaged conveyed on a conveyor belt or the like. In such a case, the angle of the image may deviate due to a deviation in the arrangement angle of the camera. Each of Patent Document 1, Patent Document 2, and Patent Document 3 discloses use of a camera to image a subject to be imaged, and a correction of an angular deviation of the image generated at the time of the imaging. To improve the accuracy of this correction, there is a method for attaching a camera with high accuracy with respect to a shaft. However, introduction of this method leads to an increase in cost. In Patent Document 1, Patent Document 2, and Patent Document 3, a method may be available in which single-time imaging is performed for a subject to be imaged by using a camera and a single visual field is used for detecting the deviation in the arrangement angle of the camera, for example, as a correction using software. However, the detection method is not expected to bring about high measurement accuracy.

The present invention has been made in view of the above problems. It is an ultimate object of the invention to provide a measurement method, and a measurement device that enable measuring a deviation amount in an arrangement angle of a camera, used for imaging a subject to be imaged, with respect to a reference direction of a shaft of the camera, and that enable correcting a deviation in the arrangement angle at low cost with high accuracy. Note that, also in each of the following application example and the following embodiment, a measurement method, a measurement device, and a non-transitory computer readable medium storing a program respectively indicate the measurement method, the measurement device, and the non-transitory computer readable medium storing a program for measuring the deviation amount in the arrangement angle of the camera with respect to the reference direction of the shaft of the camera.

The present disclosure for solving the above problems includes a measurement method for measuring a deviation amount in an arrangement angle of a camera arranged on a support with respect to a predetermined reference direction of the support, the measurement method using a target object provided with a reference mark configured to identify a straight line, the target object being parallel to the predetermined reference direction or forming a predetermined angle with respect to the predetermined reference direction, the measurement method including: an imaging step of imaging the target object a plurality of times in different visual fields by moving the camera or the target object along the predetermined reference direction; an image processing step of obtaining the straight line identified based on the reference mark, the straight line being one of a plurality of straight lines each corresponding to a corresponding one of a plurality of the reference marks, each of the reference marks being included in a corresponding one of images imaged in the different visual fields; and a calculating step of calculating a rotation angle, as the deviation amount in the arrangement angle, with which a distance between the plurality of straight lines becomes zero.

In the imaging step, the target object provided with the reference mark is imaged a plurality of times in the different visual fields. Thus, in the calculating step, it is possible to calculate the rotation angle, as the deviation amount in the arrangement angle, with high accuracy. The deviation amount in the arrangement angle measured with the above measurement method is therefore highly reliable. Finding the deviation amount in the arrangement angle with accuracy allows a correction of a deviation in the arrangement angle with high accuracy by using a manual or automatic mechanism. The above measurement method is simple, thus enabling the deviation in the arrangement angle to be corrected at low cost. The above predetermined angle is an angle of the target object with respect to the reference direction, in a case of arranging the target object not parallel to the reference direction. In either of a case where the target object is arranged parallel to the reference direction or a case where the target object is arranged not parallel to the reference direction, the rotation angle can be calculated as the deviation amount in the arrangement angle, in the calculating step.

In the disclosure, the measurement method may further include a displaying step of displaying data relating to at least one of each of the reference marks included in the corresponding one of the images imaged in the different visual fields in the imaging step, the straight line obtained in the image processing step, or the rotation angle calculated in the calculating step. According to this, it is possible to visually and numerically find the occurrence of the deviation in the arrangement angle or the deviation amount in the arrangement angle.

In the disclosure, the measurement method may further include a communicating step of transmitting the data relating to at least one of each of the reference marks included in the corresponding one of the images imaged in the different visual fields in the imaging step, the straight line obtained in the image processing step, or the rotation angle calculated in the calculating step, and receiving information related to the deviation amount in the arrangement angle based on the data. According to this, it is possible to transmit, to an external device, the occurrence of the deviation in the arrangement angle or the deviation amount in the arrangement angle. For example, it is also possible to receive feedback on a countermeasure for remedying the deviation in the arrangement angle from an expert or the like.

In the disclosure, the measurement method may further include a determining step of determining whether a degree of contamination on the reference mark exceeds a predetermined threshold, and a notifying step of notifying of a position of the contamination, a rank of the contamination, and a countermeasure in accordance with the rank when the degree of the contamination exceeds the predetermined threshold. The contamination on the reference mark may lead to difficulty in accurately recognizing the reference mark in the image processing step, thus reducing in accuracy for calculating the rotation angle in the calculating step. With the measurement method, it is possible to accurately comprehend the information related to the contamination, thereby suppressing a risk of reduction in the accuracy for calculating the rotation angle.

In the disclosure, the measurement method may be a measurement method in which presence of the contamination may be determined based on a ratio of black pixels to white pixels on the reference mark, in the determining step. According to this, the presence of the contamination is determined based on the ratio of black pixels to white pixels, thus easily implementing application of an optical inspection.

In the disclosure, the measurement method may further include a second calculating step of calculating a difference between the deviation amount in the arrangement angle and a predetermined standard value or periodically calculating the deviation amount in the arrangement angle, and a second notifying step of issuing an alert when the difference between the deviation amount in the arrangement angle and the predetermined standard value or the deviation amount in the arrangement angle is equal to or larger than a predetermined fixed value. According to this, it is possible to quickly find the deviation in the arrangement angle.

In the disclosure, the measurement method may be a measurement method in which each of a plurality of the rotation angles corresponding to a corresponding one of a plurality of the cameras is calculated, and an average value of all the rotation angles is calculated as the deviation amount in the arrangement angle, in the calculating step. According to this, it is possible to measure the deviation amount in the arrangement angle with higher reliability.

In the disclosure, the measurement method may be a measurement method in which the reference mark is a figure linearly arranged and provided on the target object. Examples of the figure include, for example, a dot and a cross. This increases variations of the reference mark at the time of designing the reference mark.

In the disclosure, the measurement method may be a measurement method in which the reference mark is a straight line drawn on the target object. This increases variations of the reference mark at the time of designing the reference mark. This also allows the straight line to be easily obtained in the image processing step.

In the disclosure, the measurement method may be a measurement method in which the reference mark is a straight line projected on the target object. An example of the projection is projection using a medium such as a laser. This allows easy projection of a reference mark with accurate dimensions on the target object.

In the disclosure, the measurement method may be a measurement method in which the reference mark is a component linearly arranged on the target object, or a linear structure formed on the target object. An example of the component linearly arranged on the target object is an LED light emitting element. This allows easy formation of a reference mark with accurate dimensions on the target object.

In the disclosure, a non-transitory computer readable medium storing a program may be provided which is configured to cause a measurement device to perform each step in the above measurement method.

The disclosure may include a measurement device including a camera arranged on a support, the measurement device being configured to measure a deviation amount in an arrangement angle of the camera with respect to a predetermined reference direction of the support, the measurement device being configured to use a target object provided with a reference mark configured to identify a straight line, the target object being parallel to the predetermined reference direction or forming a predetermined angle with respect to the predetermined reference direction, the measurement device including: an image processor configured to obtain the straight line identified based on the reference mark, the straight line being one of a plurality of straight lines each corresponding to a corresponding one of a plurality of the reference marks, each of the reference marks being included in a corresponding one of images imaged in different visual fields and acquired from the camera, after the target object is imaged a plurality of times in the different visual fields by moving the camera or the target object along the predetermined reference direction; and a calculator configured to calculate a rotation angle, as the deviation amount in the arrangement angle, with which a distance between the plurality of straight lines becomes zero.

The camera images the target object provided with the reference mark a plurality of times in the different visual fields. Thus, the calculator can calculate the rotation angle, as the deviation amount in the arrangement angle, with high accuracy. The deviation amount in the arrangement angle measured by the above measurement device is therefore highly reliable. Finding the deviation amount in the arrangement angle with accuracy allows a correction of a deviation in the arrangement angle with high accuracy by using a manual or automatic mechanism. The configuration of the above measurement device is simple, thus enabling the deviation in the arrangement angle to be corrected at low cost. In either of a case where the target object is arranged parallel to the reference direction or a case where the target object is arranged not parallel to the reference direction, the calculator can calculate the rotation angle as the deviation amount in the arrangement angle.

In the disclosure, the measurement device may further include a display unit configured to display data relating to at least one of each of the reference marks included in the corresponding one of the images imaged in the different visual fields by the camera, the straight line obtained by the image processor, or the rotation angle calculated by the calculator. With the display of the data on the display unit, it is possible to visually and numerically find the occurrence of the deviation in the arrangement angle or the deviation amount in the arrangement angle.

In the disclosure, the measurement device may further include a communication unit configured to transmit data relating to at least one of each of the reference marks included in the corresponding one of the images imaged in the different visual fields by the camera, the straight line obtained by the image processor, or the rotation angle calculated by the calculator, and configured to receive information related to the deviation amount in the arrangement angle based on the data. According to this, it is possible to transmit, to an external device, the occurrence of the deviation in the arrangement angle or the deviation amount in the arrangement angle. For example, it is also possible to receive feedback on a countermeasure for remedying the deviation in the arrangement angle from an expert or the like.

In the disclosure, the measurement device may be configured such that, when the communication unit transmits the data and receives the information related to the deviation amount in the arrangement angle, the display unit is configured to display an indication indicating that calibration of the deviation in the arrangement angle is completed. According to this, it is possible to ensure the effectiveness or safety of the measurement device, and further ensure that the measurement device is highly accurate.

In the disclosure, the measurement device may further include a determiner configured to determine whether a degree of contamination on the reference mark exceeds a predetermined threshold, and a notifier configured to notify of a position of the contamination, a rank of the contamination, and a countermeasure in accordance with the rank when the degree of the contamination exceeds the predetermined threshold. According to this, it is possible to accurately comprehend the information related to the contamination on the reference mark, thereby suppressing a risk of reduction, due to the contamination, in the accuracy for calculating the rotation angle.

In the disclosure, the measurement device may be configured such that the determiner determines presence of the contamination based on a ratio of black pixels to white pixels on the reference mark. According to this, the presence of the contamination is determined based on the ratio of black pixels to white pixels, thus easily implementing application of an optical inspection.

In the disclosure, the measurement device may further include a second calculator configured to calculate a difference between the deviation amount in the arrangement angle and a predetermined standard value or configured to periodically calculate the deviation amount in the arrangement angle, and a second notifier configured to issue an alert when the difference between the deviation amount in the arrangement angle and the predetermined standard value or the deviation amount in the arrangement angle is equal to or larger than a predetermined fixed value. According to this, it is possible to quickly find the deviation in the arrangement angle.

In the disclosure, the measurement device may be configured such that the calculator is configured to calculate each of a plurality of the rotation angles corresponding to a corresponding one of a plurality of the cameras, and configured to calculate an average value of all the rotation angles as the deviation amount in the arrangement angle. According to this, it is possible to measure the deviation amount in the arrangement angle with higher reliability.

In the disclosure, the measurement device may be configured to use the reference mark that is a figure linearly arranged and provided on the target object. This increases variations of the figure at the time of designing the reference mark.

In the disclosure, the measurement device may be configured to use the reference mark that is a straight line drawn on the target object. This increases variations of the reference mark at the time of designing the reference mark. This also allows the image processor to easily obtain the straight line.

In the disclosure, the measurement device may be configured to use the reference mark that is a straight line projected on the target object. This allows easy projection of a reference mark with accurate dimensions on the target object.

In the disclosure, the measurement device may be configured to use the reference mark that is a component linearly arranged on the target object, or a linear structure formed on the target object. This allows easy formation of a reference mark with accurate dimensions on the target object.

In the disclosure, the measurement device may automatically detect the deviation in the arrangement angle at the time of activation of the measurement device. According to this, it is possible to periodically and automatically perform maintenance for the deviation in the arrangement angle.

In the disclosure, a non-transitory computer readable medium storing a program may be provided which is configured to cause a computer to function as the above measurement device.

Note that the disclosure can be regarded as a measurement method including at least a part of the processing performed by the mechanisms described above. The disclosure can also be regarded as a measurement device including at least a part of the mechanisms. The disclosure can further be regarded as a non-transitory computer readable medium storing a computer program for causing a computer to perform each step in these methods, or a computer-readable storage medium storing the program in a non-transitory manner.

The mechanisms for solving the above problems can be used in combination with one another wherever possible.

According to the invention, in a measurement method, a measurement device, and a program for measuring a deviation amount in an arrangement angle with respect to a reference direction of a shaft of a camera, it is possible to measure the deviation amount, and correct a deviation in the arrangement angle at low cost with high accuracy.

DETAILED DESCRIPTION

Application Example

Figure 1:
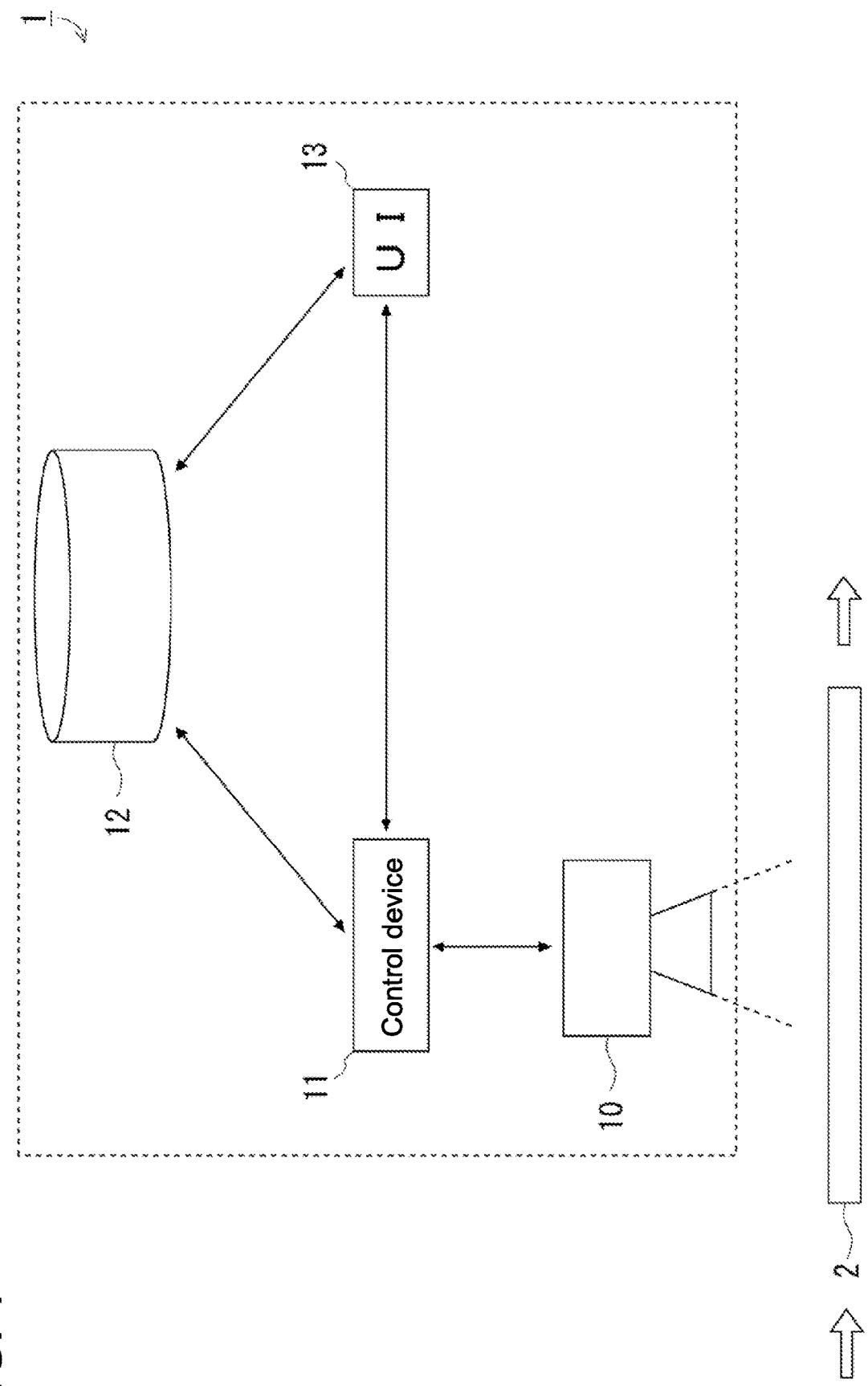
FIG. 1 is a diagram illustrating an example of a hardware configuration of a measurement device according to an embodiment.

Hereinafter, an outline of an application example of the present disclosure will be described with reference to some drawings. The disclosure is applicable to a measurement device 1 as illustrated in FIG. 1. The disclosure is applicable to a method as illustrated in each of the explanatory diagrams of FIGS. 4A to 5 by using the measurement device 1.

FIG. 1 is a diagram illustrating an example of a hardware configuration of the measurement device 1 to which the disclosure is applicable. The measurement device 1 in the application example includes a camera 10, a control device 11, a data management server 12, and a UI (User Interface) 13, which are connected to each other via a wireless or wired communication line (or lines).

Figure 3:
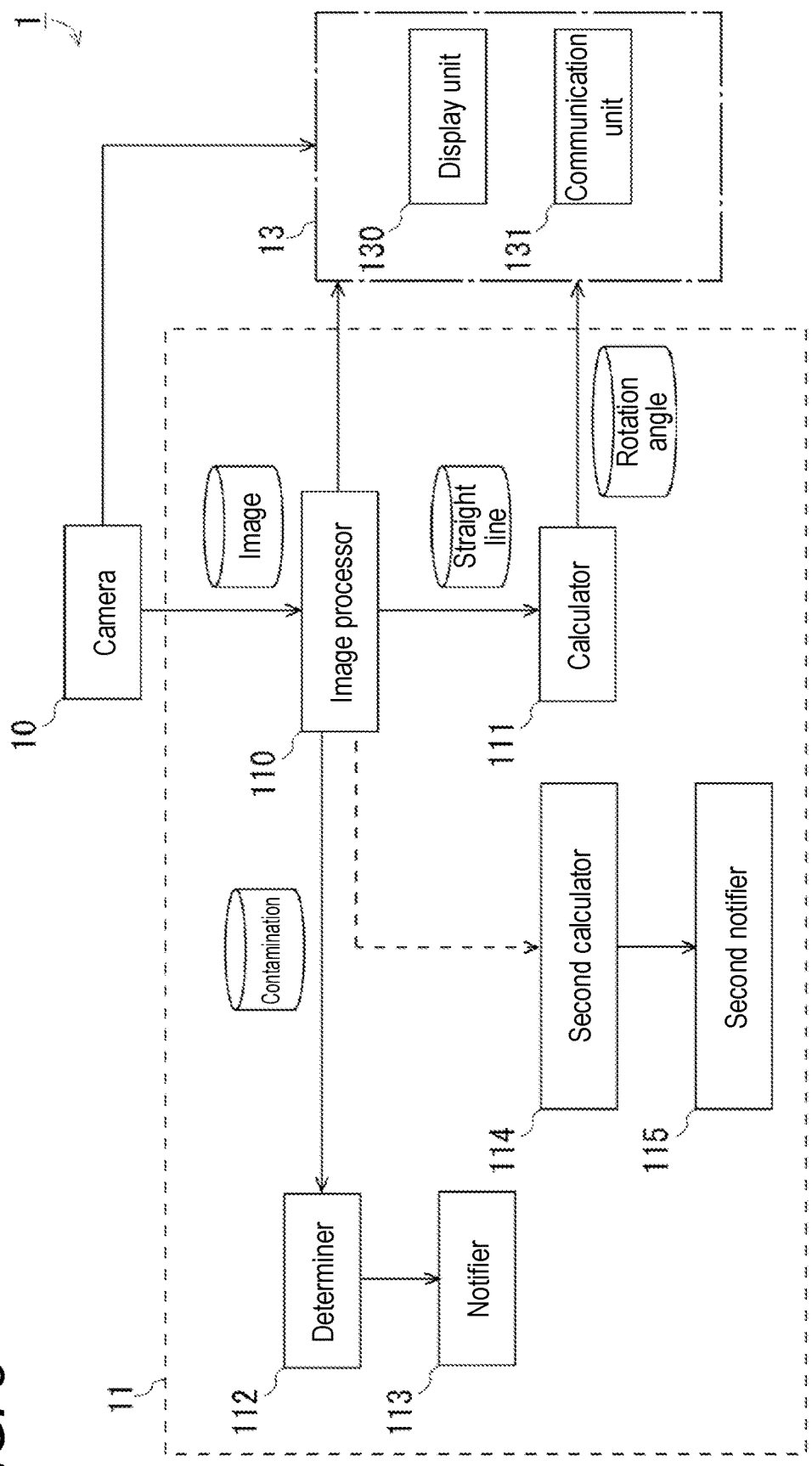
FIG. 3 is a functional block diagram illustrating an example of the measurement device according to the embodiment.

The control device 11 generates an image of an imaged subject from the imaged subject imaged by the camera 10. The control device 11 then processes the image using a non-transitory computer readable medium storing an inspection program registered in advance, thereby determining whether the state of the imaged portion in the imaged subject is satisfactory or unsatisfactory. The control device 11 includes, for example, a processor such as a central processing unit (CPU), a storage device such as a random access memory (RAM) and/or a read-only memory (ROM), and an interface with an external device, as a hardware configuration. The control device 11 provides functions forming a configuration as illustrated in FIG. 3 described below by causing the CPU to perform a non-transitory computer readable medium storing a program stored in the storage device. Some or all of the above functions may be implemented by a hardware circuit such as an application specific integrated circuit (ASIC) or a field programmable gate array (FPGA). Details of these function units will be described in the functional block diagram of FIG. 3.

An example of each subject to be imaged in the application example is an imaged portion 21 (illustrated in FIG. 2) on a printed board 2. Examples of each imaged portion 21 include wiring and a via hole on the printed board 2. The application example uses the camera 10 to image each imaged portion 21 on the printed board 2 conveyed in the direction of the arrow illustrated in FIG. 1 by a conveyance line (not illustrated). However, each imaged portion 21 may be imaged by the printed board 2 being fixed.

Examples of control performed by the control device 11 on the camera 10 and illumination (not illustrated) irradiating the printed board 2 include a change in an F-number of the optical system of the camera 10, a change in brightness of the illumination, and calibration of the camera 10 and the illumination.

The data management server 12 stores a plurality of types of data. Specifically, the data management server 12 stores the above non-transitory computer readable medium storing an inspection program and inspection content data defining inspection items and an inspection standard for each imaged portion 21. The data management server 12 also receives registration of various types of information necessary for processing in the UI 13.

Figure 2:
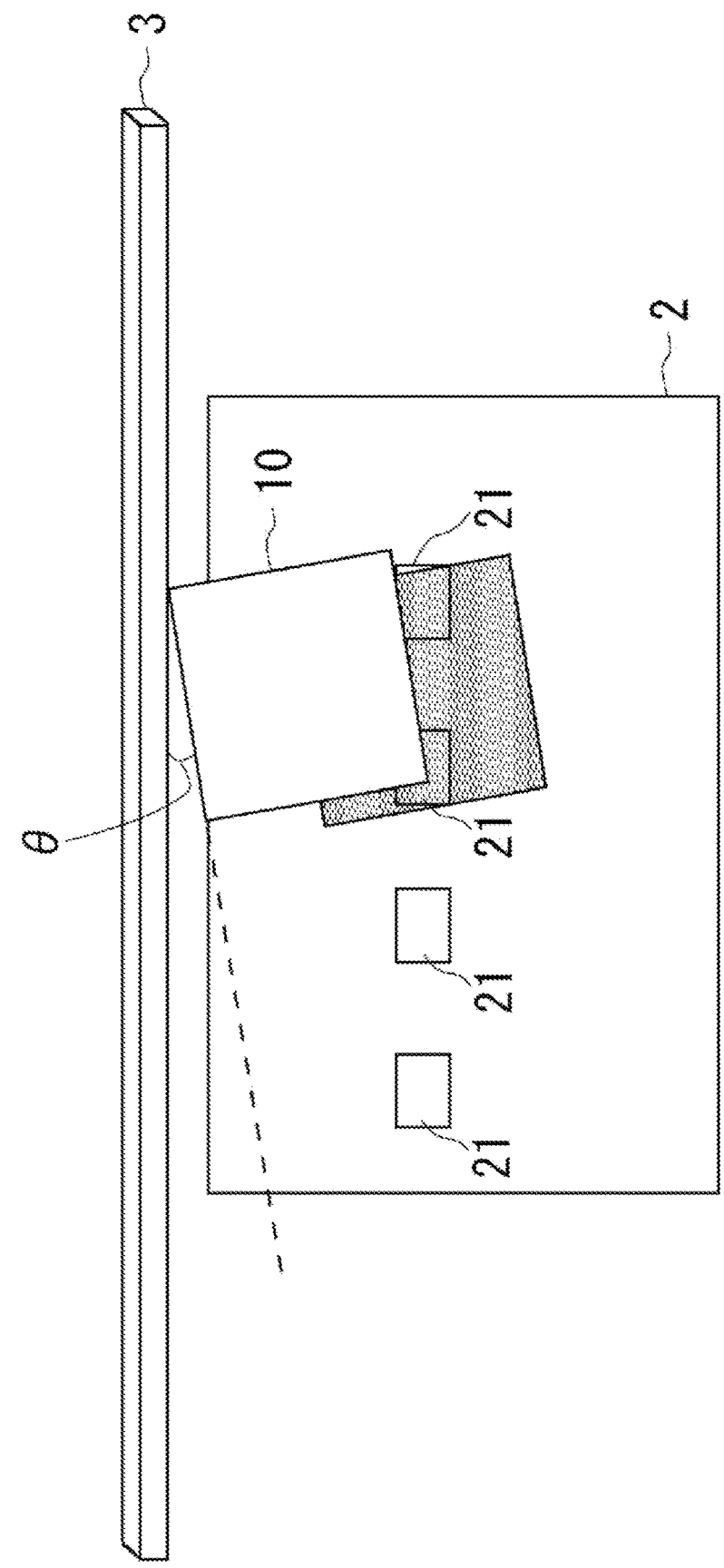
FIG. 2 is a diagram for explaining problems that may occur in imaging subjects to be imaged using a camera in the measurement device according to the embodiment and a measurement method for solving the problems.

FIG. 2 is a diagram for explaining problems that may occur in imaging subjects to be imaged using the camera 10 in the measurement device 1 to which the disclosure is applicable and a measurement method for solving the problems. FIG. 2 is also a schematic diagram illustrating a state in which the camera 10 images subjects to be imaged, as viewed from above. The camera 10 is arranged on a substantially rectangular plate (not illustrated) attached to a movable shaft 3 to be movable along the longer-side direction (hereinafter, referred to as the reference direction) of the movable shaft 3. However, at the time of arranging the camera 10 on the plate (hereinafter, the movable shaft 3 including the plate is referred to as the movable shaft 3), the camera 10 is often not fixed such that a reference axis of an image imaged using the camera 10 is parallel to the reference direction of the movable shaft 3. A deviation is thus likely to occur in an arrangement angle of the camera 10 with respect to the movable shaft 3 by an amount θ illustrated in FIG. 2. The occurrence of the deviation in the arrangement angle leads to a deviation naturally occurring also in an imaging visual field (a hatched portion illustrated in FIG. 2) of the camera 10. The deviation in the imaging visual field also makes it difficult to analyze the acquired image. To correct the deviation amount θ in the arrangement angle, that is, to bring the deviation amount θ approximate to zero, which is an ideal value, the application example uses the functions of the measurement device 1 as illustrated in the functional block diagram of FIG. 3 below to measure the deviation amount θ in the arrangement angle. A specific method will be described in the explanatory diagrams of FIGS. 4A to 5 below. The movable shaft 3 corresponds to a support in the disclosure.

FIG. 3 is a functional block diagram illustrating an example of the measurement device 1 to which the disclosure is applicable. The control device 11 of the measurement device 1 in the application example mainly includes an image processor 110 and a calculator 111. A jig 4 provided with each of a dot chart 41 and a dot chart 42 is used as illustrated in FIGS. 4A to 5 below, in measuring the deviation amount θ in the arrangement angle illustrated in FIG. 2 (hereinafter, the arrangement angle illustrated in FIG. 2 is simply referred to as the arrangement angle).

In measuring the deviation amount θ in the arrangement angle, the dot charts 41, 42 are imaged using the camera 10, first. At this time, the jig 4 is imaged a plurality of times in different visual fields by moving the camera 10 along the reference direction of the movable shaft 3, or by moving the jig 4 with each of the dot charts 41, 42 in a state of fixing the camera 10. The image processor 110 acquires the images imaged in the different visual fields from the camera 10. The image processor 110 then obtains straight lines passing through the dot charts 41, 42, while corresponding to the respective dot charts 41, 42 in the imaged images 5. Note that the slope of each straight line may be known. The calculator 111 calculates a rotation angle, as the deviation amount θ in the arrangement angle, with which a distance between the plurality of obtained straight lines becomes zero. Details will be sequentially described in the explanatory diagrams of FIGS. 4A to 5.

Figure 4A:
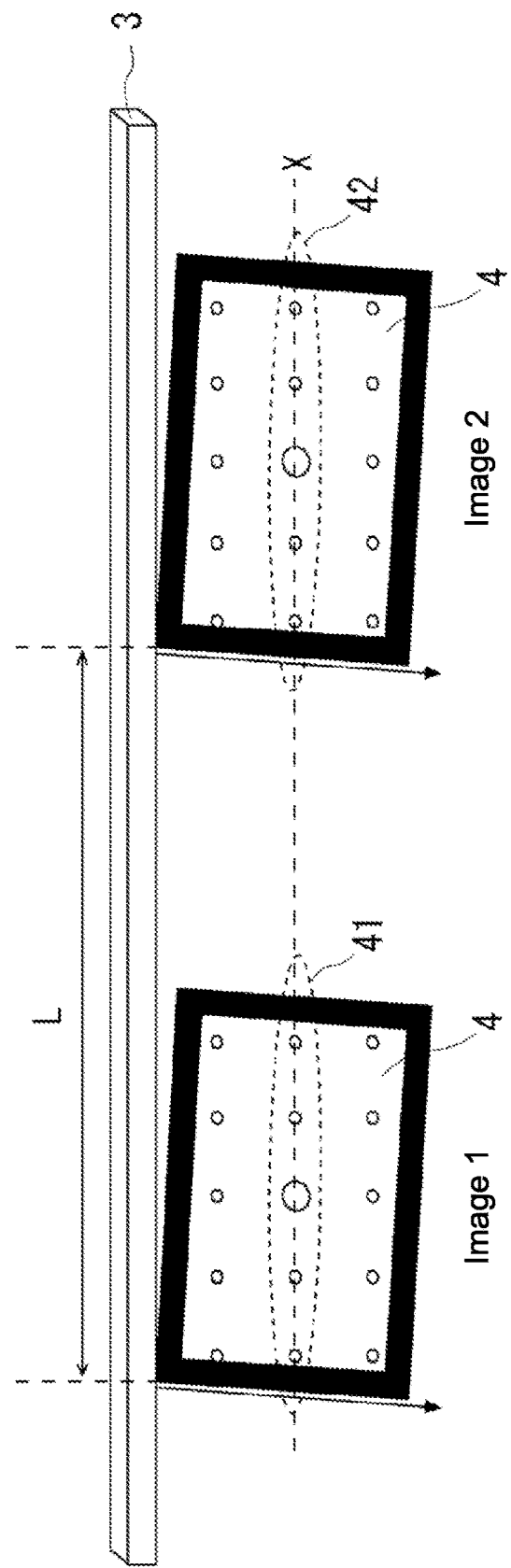
FIG. 4A is a first explanatory diagram illustrating the method for measuring a deviation amount in an arrangement angle of the camera with respect to a movable shaft by using the measurement device according to the embodiment.
Figure 5:
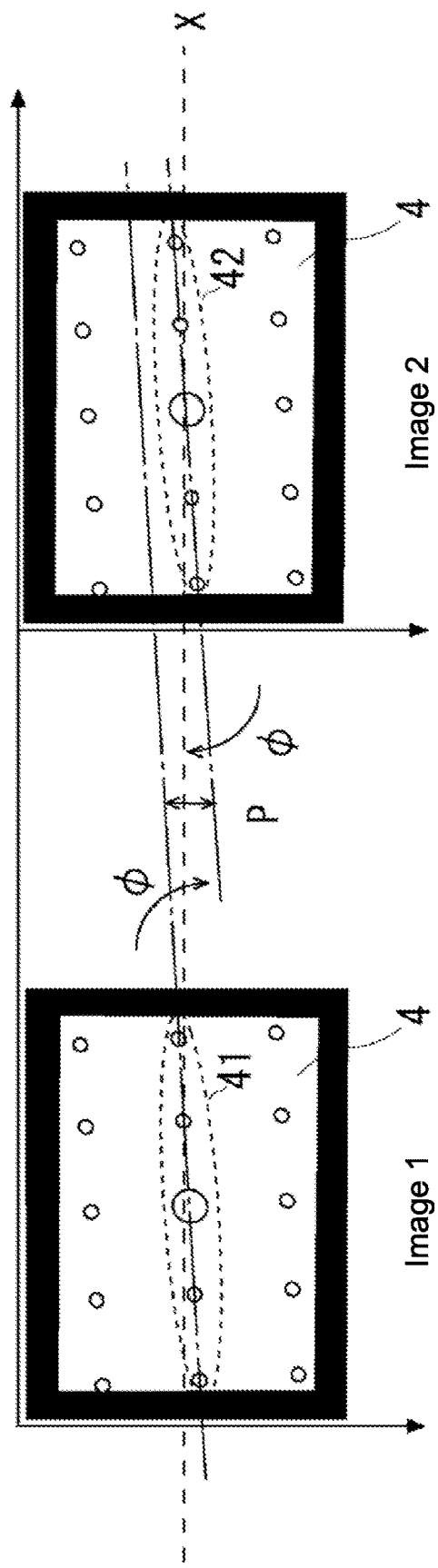
FIG. 5 is a third explanatory diagram illustrating continuation of FIG. 4B.

FIG. 4A is a first explanatory diagram illustrating the method for measuring the deviation amount θ in the arrangement angle by using the measurement device 1 to which the disclosure is applicable. As described above, the camera 10 is caused to move by a distance L along the reference direction of the movable shaft 3, first. The jig 4, with each of the dot charts 41, 42, is then imaged a plurality of times in the different visual fields. In the application example, imaging is performed twice in the different visual fields. However, the number of times of imaging is not limited to this. In each of an image 1 and an image 2 in FIG. 4A, the same jig 4, which is a subject to be imaged, is used. The imaging is thus performed for each of the different dot charts 41, 42 on the same jig 4 in the different visual fields. The dot charts 41, 42 have dimensions specifically determined in advance. Each of the dot charts 41, 42 includes a series of dots arranged in the longer-side direction (reference direction) of the jig 4, in a corresponding one of the image 1 and the image 2. The image 1 and the image 2 may include any other subjects as long as the image 1 and the image 2 include the respective dot charts 41, 42. The dot charts 41, 42 are aligned on the same straight line, in the image 1 and the image 2. The longer-side direction of the jig 4 may or may not be parallel to the reference direction of the movable shaft 3, at the time of arranging the jig 4. In the disclosure, a predetermined angle is an angle in the longer-side direction of the jig 4 with respect to the reference direction of the movable shaft 3, in a case of arranging the jig 4 with its longer-side direction not being parallel to the reference direction of the movable shaft 3. The jig 4 corresponds to a target object in the disclosure. Each of the dot charts 41, 42 corresponds to a reference mark in the disclosure.

Figure 4B:
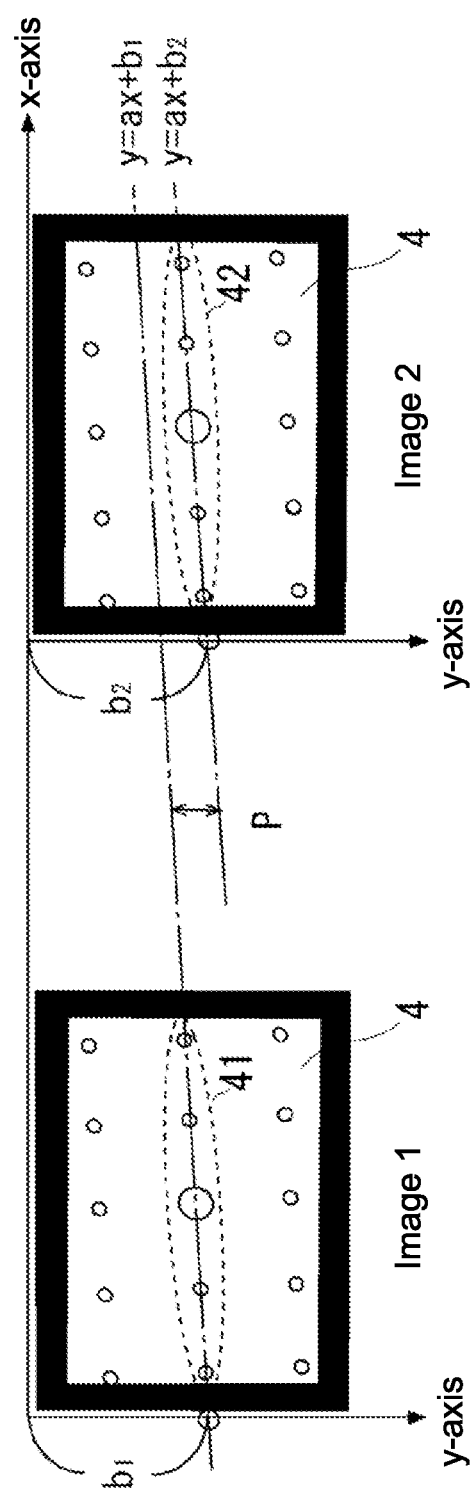
FIG. 4B is a second explanatory diagram illustrating continuation of FIG. 4A.

FIG. 4B is a second explanatory diagram illustrating continuation of FIG. 4A. The image processor 110 rotates the image 1 and the image 2. The rotation is made by regarding the reference direction of the movable shaft 3 as an x-axis, and by rotating the image 1 and the image 2 such that respective two arrows along the respective shorter-side directions of the image 1 and the image 2 (two arrows illustrated in FIG. 4A) are perpendicular to the x-axis, that is, each of the two arrows is regarded as a y-axis. After the rotation, respective straight lines ($y=ax+b_1$ and $y=ax+b_2$) are obtained that pass through the dot charts 41, 42. The two straight lines have slopes having the same inclination, and are parallel to each other. The two straight lines are thus separated from each other by a distance P in the y-axis direction at any location of the two straight lines. The equation of each of the two straight lines is obtained based on the value of the distance L.

FIG. 5 is a third explanatory diagram illustrating continuation of FIG. 4B. The two straight lines are parallel to each other. The two straight lines thus coincide with each other by rotating the two straight lines by the same angle in respective opposite directions. The rotation angle φ at the time of coincidence geometrically corresponds to the deviation amount θ in the arrangement angle. That is, the calculator 111 rotates the image 1 and the image 2 in the respective opposite directions to cause the distance P to be zero. The calculator 111 then calculates the rotation angle φ at this time as the deviation amount θ in the arrangement angle.

As described above, it is possible to measure the deviation amount θ in the arrangement angle at low cost with high accuracy by performing the method as illustrated in the explanatory diagrams of FIGS. 4A to 5, using the functions of the measurement device 1 as illustrated in the functional block diagram of FIG. 3. In the application example, an example has been described in which the jig 4 is arranged with its longer-side direction being parallel to the reference direction of the movable shaft 3. In contrast, in a case of arranging the jig 4 with its longer-side direction not being parallel to the reference direction of the movable shaft 3, a change occurs in the slope "a" in each of the equations ($y=ax+b_1$ and $y=ax+b_2$) of the two straight lines. However, even in this case, the two straight lines have the same slope in terms of inclination, and are parallel to each other. It is thus possible to calculate the deviation amount θ in the arrangement angle similarly to the case of arranging the jig 4 with its longer-side direction being parallel to the reference direction of the movable shaft 3.

Embodiment

Hereinafter, a measurement method, a measurement device 1, and a non-transitory computer readable medium storing a program according to an embodiment of the disclosure will be described in more detail with reference to the drawings (including the drawings once described in the above application example). Note that the measurement method, the measurement device 1, and the non-transitory computer readable medium storing a program according to the embodiment of the disclosure are not intended to be limited to the following configurations.
<Functional Configuration>

Here, the description returns to FIG. 3. The measurement device 1 according to the embodiment has the same configuration as that of the measurement device 1 described in the application example. Detailed description of the content described in the application example will be thus omitted. The same components will be herein described using the same reference signs.

A UI 13 of the measurement device 1 in the embodiment mainly includes a display unit 130 and a communication unit 131. The display unit 130 is, for example, a monitor or a display. The display unit 130 can visualize and display data related to the images imaged by the camera 10 (the image 1 and the image 2 illustrated in FIG. 4A), the two straight lines obtained by the image processor 110, or the rotation angle φ calculated by the calculator 111. The display unit 130 can display content as illustrated in the explanatory diagrams of FIGS. 4A to 5. However, the display unit 130 may not have a function to display all pieces of the content. The display unit 130 may just display the image 1 and the image 2, and may not display the two straight lines, for example, in a case of displaying the content as illustrated in FIG. 4B. The rotation angle φ is sought to be obtained, and thus the display unit 130 may just display the content as illustrated in FIG. 5.

The communication unit 131 can transmit the data related to the images imaged by the camera 10, the two straight lines obtained by the image processor 110, or the rotation angle φ calculated by the calculator 111 to a transmission destination. The transmission is made automatically to a transmission destination set and registered in advance, or is made to a manually input transmission destination. The communication unit 131 can receive information related to the deviation amount θ in the arrangement angle from the transmission destination based on the transmitted data. Specific examples will be illustrated in FIG. 6 described below.

The UI 13 may also include an input unit (not illustrated), such as a keyboard or a mouse, which inputs information to the control device 11. The control device 11 may include the UI 13.

The control device 11 may further include a determiner 112 and a notifier 113. For example, there may be a case in which contamination such as a foreign substance adheres to the dot charts 41, 42, in the image 1 and the image 2 acquired by the image processor 110 (the image 1 and the image 2 illustrated in FIG. 4B). In such a case, it is difficult to accurately recognize the dot charts 41, 42. The calculator 111 may thus have reduced accuracy in calculating the rotation angle φ.

The determiner 112 determines whether a degree of the contamination on the dot charts 41, 42 exceeds a predetermined threshold, in the image 1 and the image 2 acquired by the image processor 110. A criterion for determining presence of the contamination is, for example, a ratio of black pixels to white pixels on the dot charts 41, 42. The determiner 112 determines that the contamination adheres to the dot charts 41, 42, when the ratio exceeds the predetermined threshold. The notifier 113 has, for example, an alarm function such as a siren. The notifier 113 notifies of, for example, a contamination position, a contamination rank, and a countermeasure in accordance with the rank, when the degree of the contamination on the dot charts 41, 42 exceeds the predetermined threshold. The notified (or issued) content provided by the notifier 113 may be displayed on the display unit 130, or may be transmitted to an external device by the communication unit 131.

The control device 11 may further include a second calculator 114 and a second notifier 115. The second calculator 114 calculates a difference between the deviation amount θ in the arrangement angle and a predetermined standard value, or periodically calculates the deviation amount θ in the arrangement angle. At this time, the second calculator 114 may perform the calculation based on data acquired from the image processor 110. Alternatively, the second calculator 114 may perform the calculation based on past data acquired from the image processor 110 and stored in the data management server 12. Alternatively, the second calculator 114 may perform the calculation based on data directly acquired from the camera 10. The second notifier 115 issues an alert, when the difference between the deviation amount θ in the arrangement angle and the predetermined standard value, or the deviation amount θ in the arrangement angle is equal to or larger than a predetermined fixed value. A mechanism of issuing the alert is, for example, a mechanism of outputting an error message such as "the camera arrangement angle falls outside the standard" or "the change amount in the camera arrangement angle falls outside the standard value". The second notifier 115 may notify that a problem does not exist with the deviation in the arrangement angle, when the difference between the deviation amount θ in the arrangement angle and the predetermined standard value, or the deviation amount θ in the arrangement angle is smaller than the predetermined fixed value. The notified (or issued) content provided by the second notifier 115 may be displayed on the display unit 130, or may be transmitted to an external device by the communication unit 131.

In a case where the measurement device 1 includes a plurality of cameras 10, the calculator 111 may calculate each rotation angle φ corresponding to a corresponding one of the plurality of cameras 10, and calculate the average value of all the rotation angles φ as the deviation amount θ in the arrangement angle. The measurement device 1 may have a function of automatically detecting the deviation in the arrangement angle at the time of activation of the measurement device 1.

<Measurement Method>

Here, the description returns to FIGS. 4A to 5. The jig 4 is used in which a large number of dots are linearly arranged and provided, including each of the dot charts 41, 42, in measuring the deviation amount θ in the arrangement angle. However, the type of the jig 4 is not limited to this. For example, each figure provided in the jig 4 is not limited to a dot, and may be a cross, square, or other figure. A straight line drawn with high accuracy on the jig 4, such as a square chart, may be used, instead of using each of the dot charts 41, 42. Alternatively, a straight line may be used which is projected on the jig 4 through a medium such as a laser, or a component may be used which is linearly arranged on the jig 4, such as an LED light emitting element. These marks may be formed directly on the measurement device 1, instead of being formed on the jig 4. Alternatively, a mark may be a linear structure formed on the measurement device 1. An example of the structure may be a rail or the like forming the movable shaft 3.

Figure 6:
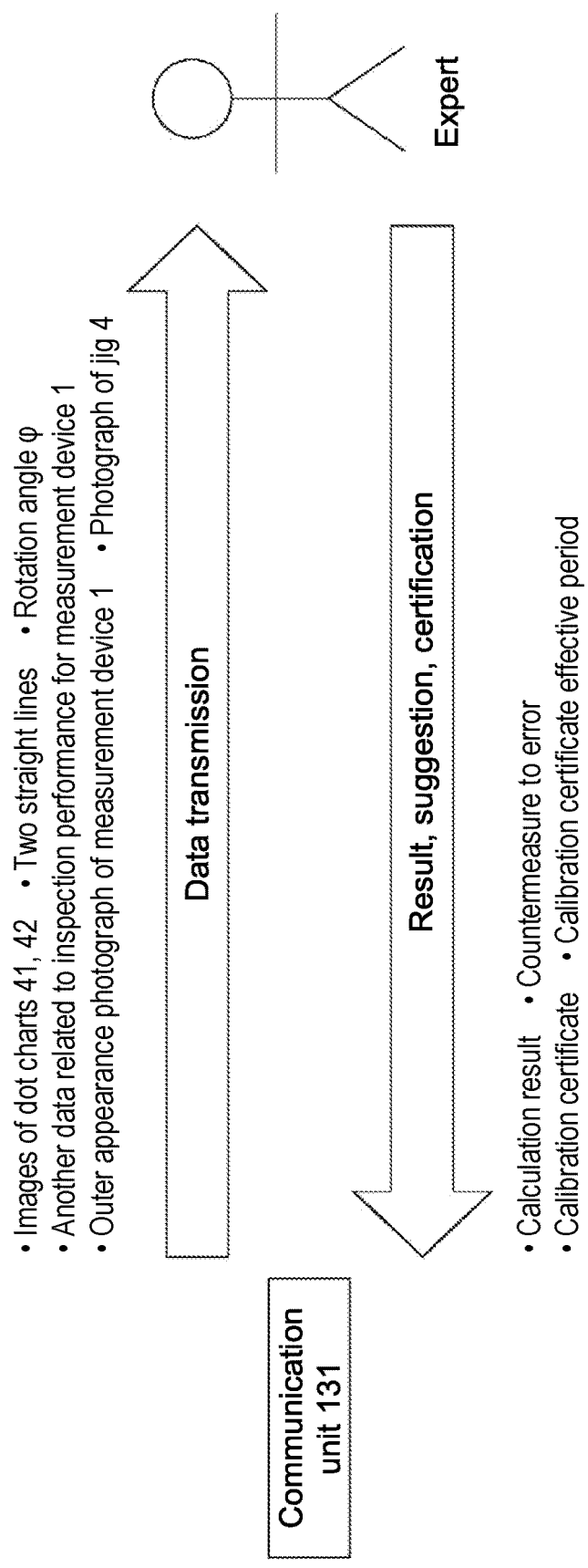
FIG. 6 is an explanatory diagram illustrating an example of content transmitted and received by a communication unit in the measurement device according to the embodiment.

FIG. 6 is an explanatory diagram illustrating an example of content transmitted and received by the communication unit 131 in the measurement device 1 according to the embodiment. As an outline, the communication unit 131 transmits data to an expert related to the measurement device 1 (a designer, a manufacturer, an administrator, or the like of the measurement device 1). The expert then performs measurement, determination, or the like based on the data. The communication unit 131 receives information related to the deviation amount θ in the arrangement angle based on the data.

Examples of the data transmitted from the communication unit 131 to the expert are as described above and include the images of the dot charts 41, 42 imaged by the camera 10, the two straight lines (or the respective equations of the two straight lines) obtained by the image processor 110, and the rotation angle φ calculated by the calculator 111. Besides these examples, another example is data related to inspection performance for the measurement device 1, an outer appearance photograph of the measurement device 1 or a photograph of the jig 4, or the like. For example, in a case where data to be transmitted is the images of the dot charts 41, 42 or the two straight lines, the expert can calculate the rotation angle φ based on the data, and feed back the rotation angle φ as a calculation result. In a case where the data to be transmitted is the rotation angle φ, the expert can determine that a problem does not exist in the arrangement of the camera 10 with respect to the movable shaft 3, if the rotation angle φ is a value approximate to zero. If the rotation angle φ is a value that is not approximate to zero, the expert can suggest a method of manually correcting the deviation in the arrangement angle as a countermeasure to the error. In a case where the data to be transmitted is the outer appearance photograph of the measurement device 1, the expert can check aging degradation of the measurement device 1, and suggest a maintenance measure or the like as a countermeasure to the error. In a case where the data to be transmitted is the photograph of the jig 4, the expert can visually check contamination on the dot charts 41, 42, and suggest cleaning of the jig 4.

There may be a case in which the communication unit 131 transmits the above data to the expert, and receives the information related to the deviation amount θ in the arrangement angle from the expert based on the above data. In such a case, the communication unit 131 may receive a calibration certificate or a calibration certificate effective period, as certification certifying completion of calibrating the deviation in the arrangement angle, along with the information. At this time, the display unit 130 may display the calibration certificate or the calibration certificate effective period. The calibration certificate or the calibration certificate effective period may have updatable specifications. The display unit 130 may display an indication indicating that the calibration certificate effective period is approaching or has passed, in such a case.

<Flowchart>

Figure 7:
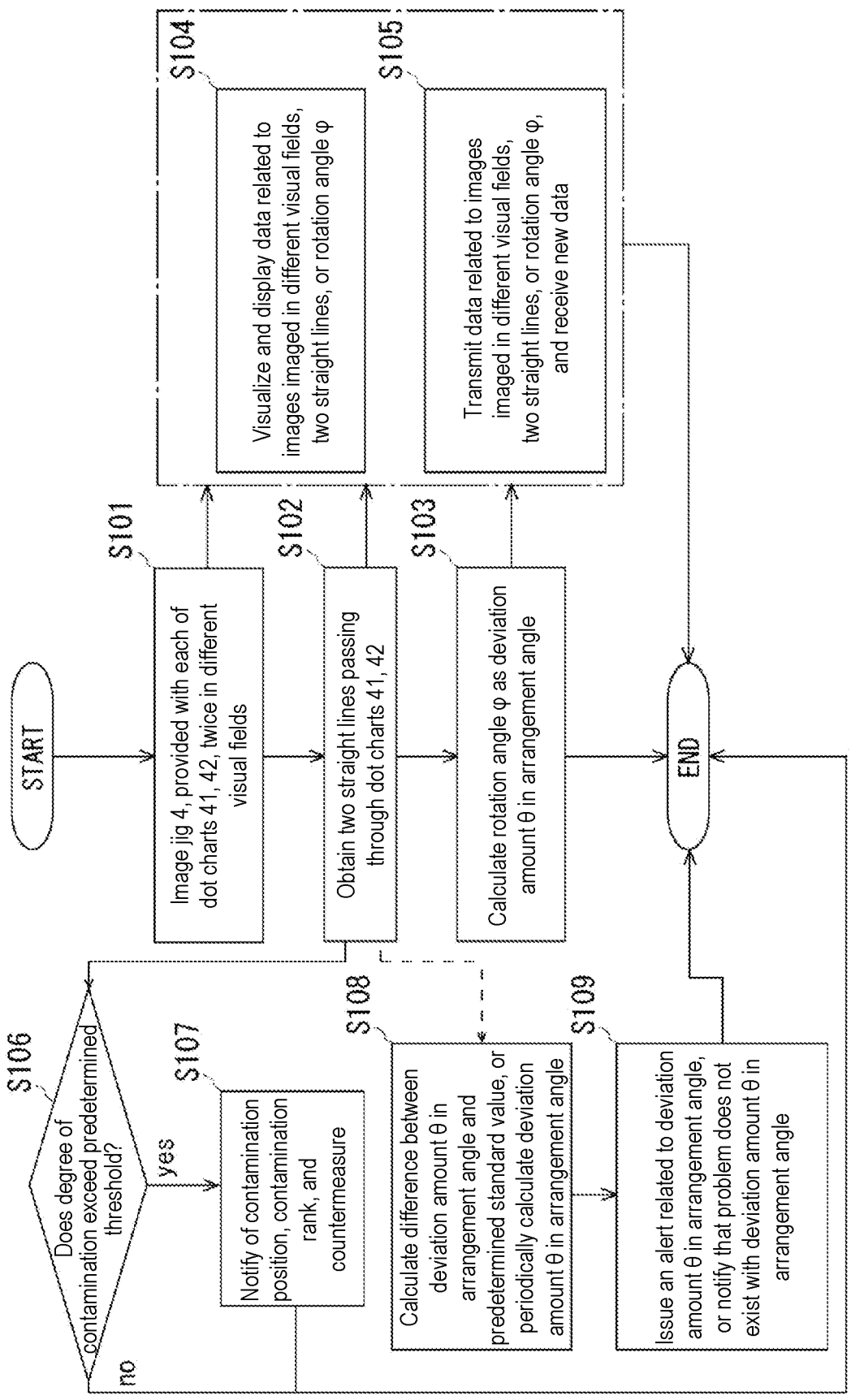
FIG. 7 is a flowchart illustrating a procedure of the measurement method using the measurement device according to the embodiment.

FIG. 7 is a flowchart illustrating a procedure of the measurement method using the measurement device 1 according to the embodiment. In this flowchart, first, the jig 4 is imaged twice in different visual fields by moving the camera 10 along the reference direction of the movable shaft 3, or by moving the jig 4 with each of the dot charts 41, 42 in a state of fixing the camera 10 (Step S101). At this time, the imaging is performed such that the images include the respective dot charts 41, 42. The number of times of imaging may be more than two. Step S101 corresponds to an imaging step in the disclosure, and the illustration of FIG. 4A in the embodiment. Next, the image processor 110 acquires the images imaged in the different visual fields from the camera 10, and then obtains two straight lines passing through the dot charts 41, 42, while corresponding to the respective dot charts 41, 42 in the images (Step S102). The two straight lines are parallel to each other, and are separated from each other by a certain distance in a predetermined direction at any location of the two straight lines. Step S102 corresponds to an image processing step in the disclosure, and the illustration of FIG. 4B in the embodiment. Next, the calculator 111 rotates the respective images imaged in the different visual fields in the opposite directions such that the certain distance between the two straight lines becomes zero, that is, the two straight lines overlap and coincide with each other, and calculates the rotation angle φ at this time as the deviation amount θ in the arrangement angle (Step S103). Step S103 corresponds to a calculating step in the disclosure, and the illustration of FIG. 5 in the embodiment.

The display unit 130 can visualize and display the data related to the images imaged in the different visual fields in the imaging step S101, the two straight lines obtained in the image processing step S102, or the rotation angle φ calculated in the calculating step S103 (Step S104). Step S104 corresponds to a displaying step in the disclosure. The communication unit 131 can transmit the data related to the images imaged in the different visual fields in the imaging step S101, the two straight lines obtained in the image processing step S102, or the rotation angle φ calculated in the calculating step S103 to a transmission destination. The transmission is made automatically to a transmission destination set and registered in advance, or is made to a manually input transmission destination. The communication unit 131 can also receive information related to the deviation amount θ in the arrangement angle from the transmission destination based on the transmitted data (Step S105). Step S105 corresponds to a communicating step in the disclosure, and the illustration of FIG. 6 in the embodiment.

The determiner 112 determines whether a degree of contamination on the dot charts 41, 42 exceeds a predetermined threshold, in the images acquired in the image processing step S102 (Step S106). When the degree of the contamination exceeds the predetermined threshold (Step S106: Yes), the determiner 112 determines that the contamination adheres to the dot charts 41, 42. In this case, the notifier 113 notifies of a contamination position, a contamination rank, and a countermeasure in accordance with the rank (Step S107). Step S106 corresponds to a determining step in the disclosure. Step S107 corresponds to a notifying step in the disclosure. When the degree of the contamination does not exceed the predetermined threshold (Step S106: No), the notifier 113 does not function.

The second calculator 114 calculates a difference between the deviation amount θ in the arrangement angle and a predetermined standard value, or periodically calculates the deviation amount θ in the arrangement angle (Step S108). At this time, the second calculator 114 may perform the calculation based on the data acquired in the image processing step S102. Alternatively, the second calculator 114 may perform the calculation based on data acquired in the past in the image processing step S102 and stored in the data management server 12. Alternatively, the second calculator 114 may perform the calculation based on data acquired directly in the imaging step S101. Step S108 corresponds to a second calculating step in the disclosure. The second notifier 115 issues (notifies of) an alert, when the difference between the deviation amount θ in the arrangement angle and the predetermined standard value, or the deviation amount θ in the arrangement angle is equal to or larger than a predetermined fixed value, in the second calculating step S108 (Step S109). Step S109 corresponds to a second notifying step in the disclosure. The second notifier 115 may notify that a problem does not exist with the deviation in the arrangement angle, when the difference between the deviation amount θ in the arrangement angle and the predetermined standard value, or the deviation amount θ in the arrangement angle is smaller than the predetermined fixed value.

Appendix 1

A measurement method for measuring a deviation amount in an arrangement angle of a camera (10) arranged on a support (3) with respect to a predetermined reference direction of the support, the measurement method using a target object (4) provided with a reference mark (41, 42) configured to identify a straight line, the target object being parallel to the predetermined reference direction or forming a predetermined angle with respect to the predetermined reference direction, the measurement method including:
  an imaging step (Step S101) of imaging the target object a plurality of times in different visual fields by moving the camera or the target object along the predetermined reference direction;
  an image processing step (Step S102) of obtaining the straight line identified based on the reference mark, the straight line being one of a plurality of straight lines each corresponding to a corresponding one of a plurality of the reference marks, each of the reference marks being included in a corresponding one of images imaged in the different visual fields; and a calculating step (Step S103) of calculating a rotation angle, as the deviation amount in the arrangement angle, with which a distance between the plurality of straight lines becomes zero.

Appendix 2

A measurement device (1) including a camera (10) arranged on a support (3), the measurement device being configured to measure a deviation amount in an arrangement angle of the camera with respect to a predetermined reference direction of the support, the measurement device being configured to use a target object (4) provided with a reference mark (41, 42) configured to identify a straight line, the target object being parallel to the predetermined reference direction or forming a predetermined angle with respect to the predetermined reference direction, the measurement device including:

an image processor (110) configured to obtain the straight line identified based on the reference mark, the straight line being one of a plurality of straight lines each corresponding to a corresponding one of a plurality of the reference marks, each of the reference marks being included in a corresponding one of images imaged in different visual fields and acquired from the camera, after the target object is imaged a plurality of times in the different visual fields by moving the camera or the target object along the predetermined reference direction; and a calculator (111) configured to calculate a rotation angle, as the deviation amount in the arrangement angle, with which a distance between the plurality of straight lines becomes zero.

The invention claimed is:

1. A measurement method for measuring a deviation amount in an arrangement angle of a camera arranged on a support with respect to a predetermined reference direction of the support, the measurement method using a target object provided with a reference mark configured to identify a straight line, the target object being parallel to the predetermined reference direction or forming a predetermined angle with respect to the predetermined reference direction, the measurement method comprising:

an imaging step of imaging the target object a plurality of times in different visual fields by moving the camera or the target object along the predetermined reference direction;

an image processing step of obtaining the straight line identified based on the reference mark, the straight line being one of a plurality of straight lines each corresponding to a corresponding one of a plurality of the reference marks, each of the reference marks being included in a corresponding one of images imaged in the different visual fields; and a calculating step of calculating a rotation angle, as the deviation amount in the arrangement angle, with which a distance between the plurality of straight lines becomes zero.

2. A measurement device comprising a camera arranged on a support, the measurement device being configured to measure a deviation amount in an arrangement angle of the camera with respect to a predetermined reference direction of the support, the measurement device being configured to use a target object provided with a reference mark configured to identify a straight line, the target object being parallel to the predetermined reference direction or forming a predetermined angle with respect to the predetermined reference direction, the measurement device comprising:

an image processor configured to obtain the straight line identified based on the reference mark, the straight line being one of a plurality of straight lines each corresponding to a corresponding one of a plurality of the reference marks, each of the reference marks being included in a corresponding one of images imaged in different visual fields and acquired from the camera, after the target object is imaged a plurality of times in the different visual fields by moving the camera or the target object along the predetermined reference direction; and a calculator configured to calculate a rotation angle, as the deviation amount in the arrangement angle, with which a distance between the plurality of straight lines becomes zero.

3. The measurement device according to claim 2, further comprising a display unit configured to display data relating to at least one of each of the reference marks included in the corresponding one of the images imaged in the different visual fields by the camera, the straight line obtained by the image processor, or the rotation angle calculated by the calculator.

4. The measurement device according to claim 2, further comprising a communication unit configured to transmit data relating to at least one of each of the reference marks included in the corresponding one of the images imaged in the different visual fields by the camera, the straight line obtained by the image processor, or the rotation angle calculated by the calculator, and receive information related to the deviation amount in the arrangement angle based on the data.

5. The measurement device according to claim 4, wherein, when the communication unit transmits the data and receives the information related to the deviation amount in the arrangement angle, the display unit is configured to display an indication indicating that calibration of a deviation in the arrangement angle is completed.

6. The measurement device according to claim 2, further comprising:

a second calculator configured to calculate a difference between the deviation amount in the arrangement angle and a predetermined standard value, or periodically calculate the deviation amount in the arrangement angle; and a second notifier configured to issue an alert, when the difference between the deviation amount in the arrangement angle and the predetermined standard value, or the deviation amount in the arrangement angle is equal to or larger than a predetermined fixed value.

7. The measurement device according to claim 2, wherein the calculator is configured to calculate each of a plurality of the rotation angles corresponding to a corresponding one of a plurality of the cameras, and calculate an average value of all the rotation angles as the deviation amount in the arrangement angle.

8. The measurement device according to claim 2, wherein the reference mark is a figure linearly arranged and provided on the target object.

9. The measurement device according to claim 2, wherein the reference mark is a straight line drawn on the target object.

10. The measurement device according to claim 2, wherein the reference mark is a component linearly arranged on the target object, or a linear structure formed on the target object.

11. The measurement device according to claim 2, wherein the measurement device is configured to automatically detect a deviation in the arrangement angle at a time of activation of the measurement device.

12. A non-transitory computer readable medium storing a program configured to cause a computer to function as the measurement device according to claim 2.

* * * * *